United States Patent
Stroh et al.

(10) Patent No.: US 7,894,968 B2
(45) Date of Patent: Feb. 22, 2011

(54) ACCELERATOR/BRAKE PEDAL MANAGEMENT FOR TORQUE-BASED ENGINE CONTROL

(75) Inventors: David J. Stroh, Farmington Hills, MI (US); Robert C. Simon, Jr., Novi, MI (US); Leonard G. Wozniak, Ann Arbor, MI (US); William R. Cawthorne, Milford, MI (US)

(73) Assignee: GM Global Technology Operations, Inc.

( * ) Notice: Subject to any disclaimer, the term of this patent is extended or adjusted under 35 U.S.C. 154(b) by 848 days.

(21) Appl. No.: 11/685,714

(22) Filed: Mar. 13, 2007

(65) Prior Publication Data

US 2008/0228369 A1      Sep. 18, 2008

(51) Int. Cl.
G05F 7/00 (2006.01)

(52) U.S. Cl. .................... 701/84; 701/85; 303/141; 477/182

(58) Field of Classification Search ................ 303/141; 477/182; 701/84, 85
See application file for complete search history.

(56) References Cited

U.S. PATENT DOCUMENTS

| | | | | |
|---|---|---|---|---|
| 5,365,431 A | * | 11/1994 | Minezawa et al. | 701/22 |
| 2006/0289211 A1 | * | 12/2006 | Mashiki | 180/65.2 |
| 2008/0120006 A1 | * | 5/2008 | Hommi et al. | 701/84 |

* cited by examiner

*Primary Examiner*—Mark Hellner
*Assistant Examiner*—Helal A Algahaim

(57) ABSTRACT

A method and system for regulating a drive torque provided to a driveline of a vehicle includes monitoring an accelerator pedal position and a brake pedal position. An adjusted accelerator pedal position is determined based on the accelerator pedal position and the brake pedal position and a drive torque request is determined based on the adjusted accelerator pedal position. Drive torque is generated based on the drive torque request.

7 Claims, 5 Drawing Sheets

ACCELERATOR/BRAKE PEDAL MANAGEMENT FOR TORQUE-BASED ENGINE CONTROL

FIELD

The present disclosure relates to torque-based control systems for vehicles, and more particular to drive torque control for torque-based control systems.

BACKGROUND

The statements in this section merely provide background information related to the present disclosure and may not constitute prior art.

Vehicle powertrains generate drive torque that is transferred through a vehicle driveline to propel the vehicle. The powertrain typically includes a powerplant including, but not limited to, an internal combustion engine and/or an electric machine. Operation of the powerplant is often regulated using a torque-based control system, wherein driver inputs are interpreted as a drive torque request and the powerplant is regulated to achieve the drive torque request.

In torque-based control systems, the drive torque request can be interpreted from the brake and accelerator pedal inputs. In some cases, such as with so-called two-footed drivers (i.e., a driver that concurrently depresses both the accelerator pedal and the brake pedal), conflicting driver inputs result in non-optimized system performance. At low speeds, the driver expects some positive amount of creep torque. When the brake pedal is depressed, this creep torque fights the braking force of the brake system resulting in inefficient operation.

SUMMARY

Accordingly, the present invention provides a method and system for regulating a drive torque provided to a driveline of a vehicle. An accelerator pedal position and a brake pedal position are monitored. An adjusted accelerator pedal position is determined based on the accelerator pedal position and the brake pedal position and a drive torque request is determined based on the adjusted accelerator pedal position. Drive torque is generated based on the drive torque request.

In other features, a phase-out ratio is determined based on the brake pedal position and the accelerator pedal position. The adjusted accelerator pedal position is determined as a product of the accelerator pedal position and the phase-out ratio.

In still other features, a creep torque is determined based on a vehicle speed and the brake pedal position. The creep torque decreases with increasing brake pedal position and increasing vehicle speed. The drive torque is generated based on the creep torque when the vehicle speed is below a threshold vehicle speed. The creep torque is reduced when the brake pedal position is greater than zero and less than a threshold brake pedal position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
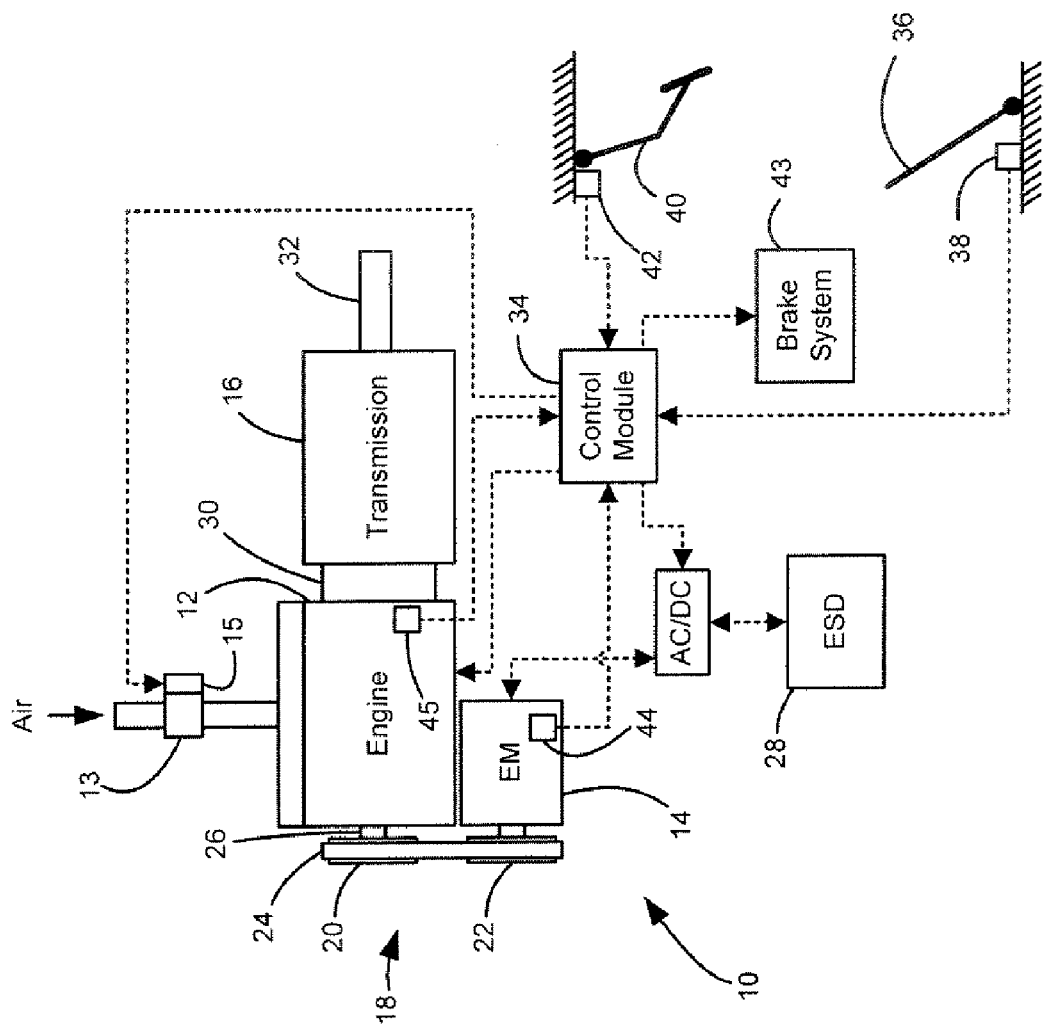
FIG. 1 is a functional block diagram of a torque-based controlled vehicle.

The following description is merely exemplary in nature and is not intended to limit the present disclosure, application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary hybrid vehicle 10 includes an engine 12 and an electric machine 14, which drive a transmission 16. Air is drawn into the engine 12 through a throttle 13, whose position is regulated by a throttle actuator 15. The air is mixed with fuel, and the air/fuel mixture is combusted within cylinders (not shown) to generate drive torque. The electric machine 14 supplements the engine 12 to produce drive torque to drive the transmission 16. The drive torque is generated based on a torque request ($T_{REQ}$), which is discussed in further detail below. In this manner, fuel efficiency is increased and emissions are reduced. At low vehicle speeds, such as when the vehicle 10 is traveling in a parking lot or along a driveway, the electric machine 14 generates a creep torque ($T_{CREEP}$) to slowly propel the vehicle 10.

The engine 12 and electric machine 14 are coupled via a belt-alternator-starter (BAS) system 18. More specifically, the electric machine 14 operates as a starter (i.e., motor) and an alternator (i.e., generator) and is coupled to the engine 12 through a belt and pulley system. The engine 12 and the electric machine 14 include pulleys 20, 22, respectively, that are coupled for rotation by a belt 24. The pulley 20 is coupled for rotation with a crankshaft 26 of the engine 12.

In one mode, the engine 12 drives the electric machine 14 to generate power used to recharge an energy storage device (ESD) 28. In another mode, the electric machine 14 drives the engine 12 using energy from the ESD 28. The ESD 28 can include, but is not limited to, a battery or a super-capacitor. Alternatively, the BAS system 18 can be replaced with a flywheel-alternator-starter (FAS) system (not shown), which includes an electric machine operably disposed between the engine and the transmission or a chain or gear system that is implemented between the electric machine 14 and the crankshaft 26.

The transmission 16 can include, but is not limited to, a manual transmission, an automatic transmission, a continuously variable transmission (CVT) and an automated manual transmission (AMT). Drive torque is transferred from the engine crankshaft 26 to the transmission 16 through a coupling device 30. The coupling device 30 can include, but is not limited to, a friction clutch or a torque converter depending upon the type of transmission implemented. The transmission 16 multiplies the drive torque through one of a plurality of gear ratios to drive a driveshaft 32.

A control module 34 regulates operation of the vehicle 10. The control module 34 controls fuel injection and spark to selectively activate and deactivate cylinders of the engine 12. More specifically, when the vehicle 10 is at rest, none of the cylinders of the engine 12 are firing (i.e., are deactivated) and the engine 12 is stopped. During vehicle launch (i.e., acceleration from rest), the electric machine 14 drives the crankshaft to spin-up the engine 12 to an idle RPM and to initiate vehicle acceleration. During periods where low drive torque is needed to drive the vehicle, the engine cylinders do not fire and the valves can be deactivated. Drive torque is provided by the electric machine 14. When deactivated, fuel and spark are cut-off to the cylinders of the engine. Further, opening and closing cycles of the intake and exhaust valves can be prevented to inhibit air flow processing within the cylinders.

An accelerator pedal 36 is provided. A pedal position sensor 36 is sensitive to a position of the accelerator pedal 36 and generates a pedal position signal based thereon. A brake pedal 40 is provided. A brake pedal position sensor 42 is sensitive to a position of the brake pedal 40 and generates a pedal position signal based thereon. The control module 34 operates a brake system 43 based on the brake pedal position signal to adjust a pressure within the brake system, which in turn regulates a braking force of brakes (not shown).

An EM position sensor 44 is responsive to the rotational position of a rotor of the electric machine 14 and a rotational speed of the electric machine 14 ($RPM_{EM}$) is determined based thereon. Similarly, an engine position sensor 45 is responsive to the rotational position of the crankshaft 26 and a rotational speed of the engine 12 ($RPM_{ENG}$) is determined based thereon. The control module 34 operates the vehicle 10 based on the pedal position signals generated by the pedal position sensors 38, 42 and the signals generated by the position sensors 44, 45, as described in further detail below.

Figure 2:
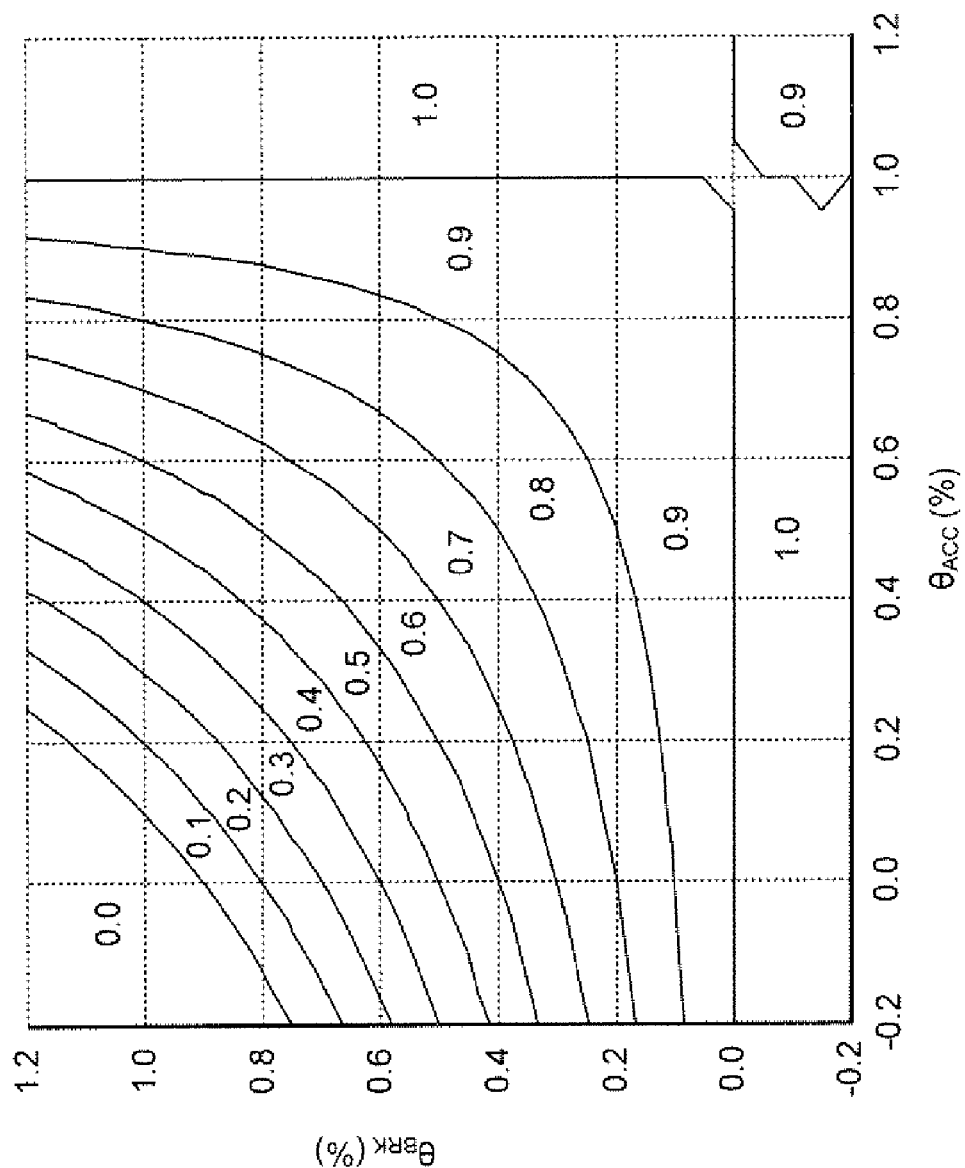
FIG. 2 is a graph illustrating accelerator pedal position phase-out ratio curves.
Figure 3:
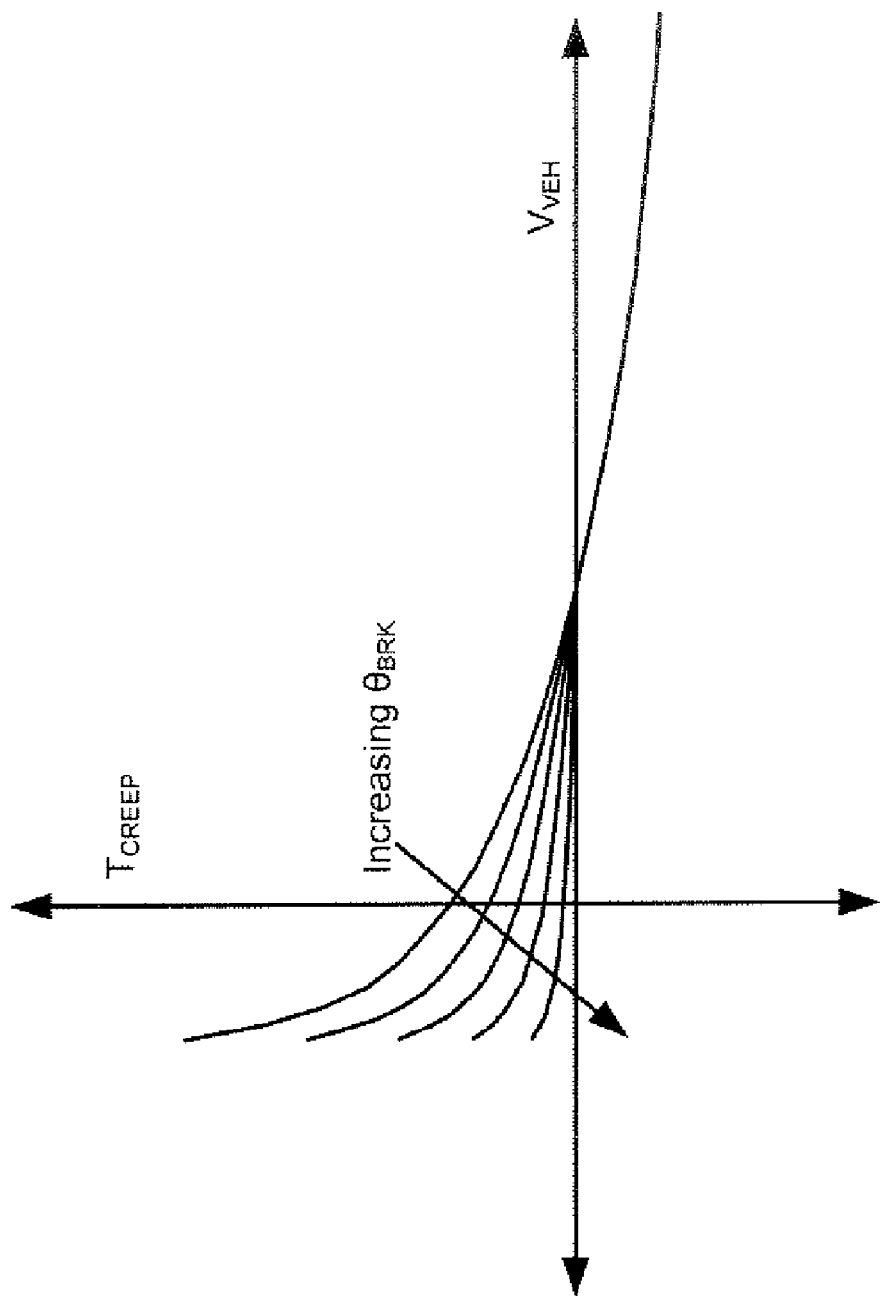
FIG. 3 is a graph illustrating creep torque phase out curves.

Referring now to FIGS. 2 and 3, the drive torque control of the present invention will be described in further detail. Two of the primary driver inputs for torque-based control systems are the accelerator pedal position ($\theta_{ACC}$) and the brake pedal position ($\theta_{BRK}$). These two inputs are used to interpret the driver torque demand and generate a drive torque request ($T_{REQ}$). The drive torque control provides an accelerator pedal phase-out and a creep torque phase-out.

More specifically, an accelerator pedal phase-out ratio ($r_{PO}$) is determined based on $\theta_{ACC}$ and $\theta_{BRK}$. $r_{PO}$ ranges between 0 and 1 and can be determined from a look-up table, which is graphically illustrated in FIG. 2. An adjusted accelerator pedal position ($\theta_{ACCADJ}$) is determined as a product of $\theta_{ACC}$ and $r_{PO}$. $T_{REQ}$ is determined based on $\theta_{ACCADJ}$. In this manner, $r_{PO}$ is applied to $\theta_{ACC}$ and not directly to $T_{REQ}$ so as to not decrease the amount of coast down (i.e., negative) torque and to allow the brake to bring the torque back to the creep/coast value as specified for zero accelerator pedal input.

If the vehicle speed ($V_{VEH}$) is below a vehicle speed threshold ($V_{THR}$) and $\theta_{BRK}$ is greater than 0 and less than a brake pedal position threshold ($\theta_{THR}$), $T_{CREEP}$ is phased-out. More specifically, $T_{CREEP}$ is determined from a look-up table, which is graphically illustrated in FIG. 3. As $\theta_{BRK}$ increases and $V_{VEH}$ increases, $T_{CREEP}$ decreases. The purpose of the $T_{CREEP}$ phase-out is to phase out the positive creep torque requested by the driver at low vehicle speeds when the driver is on the brake. In this manner, energy waste that results from the brakes fighting the torque system is reduced. This function takes advantage of the flexibility of the electric motor in a hybrid system to deliver any amount of torque at low speed, unconstrained by idle speed requirements as in a conventional engine with a torque converter.

In one embodiment, a scalar is applied to $T_{REQ}$. Hysteresis is provided to avoid hunting or flutter around the $V_{THD}$ switch point. The scalar is based on $\theta_{BRK}$ and potentially $V_{VEH}$. In an alternative embodiment, a scalar is applied to the positive-only creep/coast (i.e. creep) torque. The scalar is determined based on $\theta_{BRK}$. The alternative embodiment provides a more seamless implementation because it does not require two speed-based zones of operation with hysteresis to avoid flutter between zones. As the vehicle rolls backward, for example, the creep torque actually increases to counter the backward motion. Since this is also positive torque, it is phased out in a similar manner as the brake pedal is depressed. If need be, the phase-out scalar can be determined as a function of both $V_{VEH}$ and $\theta_{BRK}$.

Figure 4:
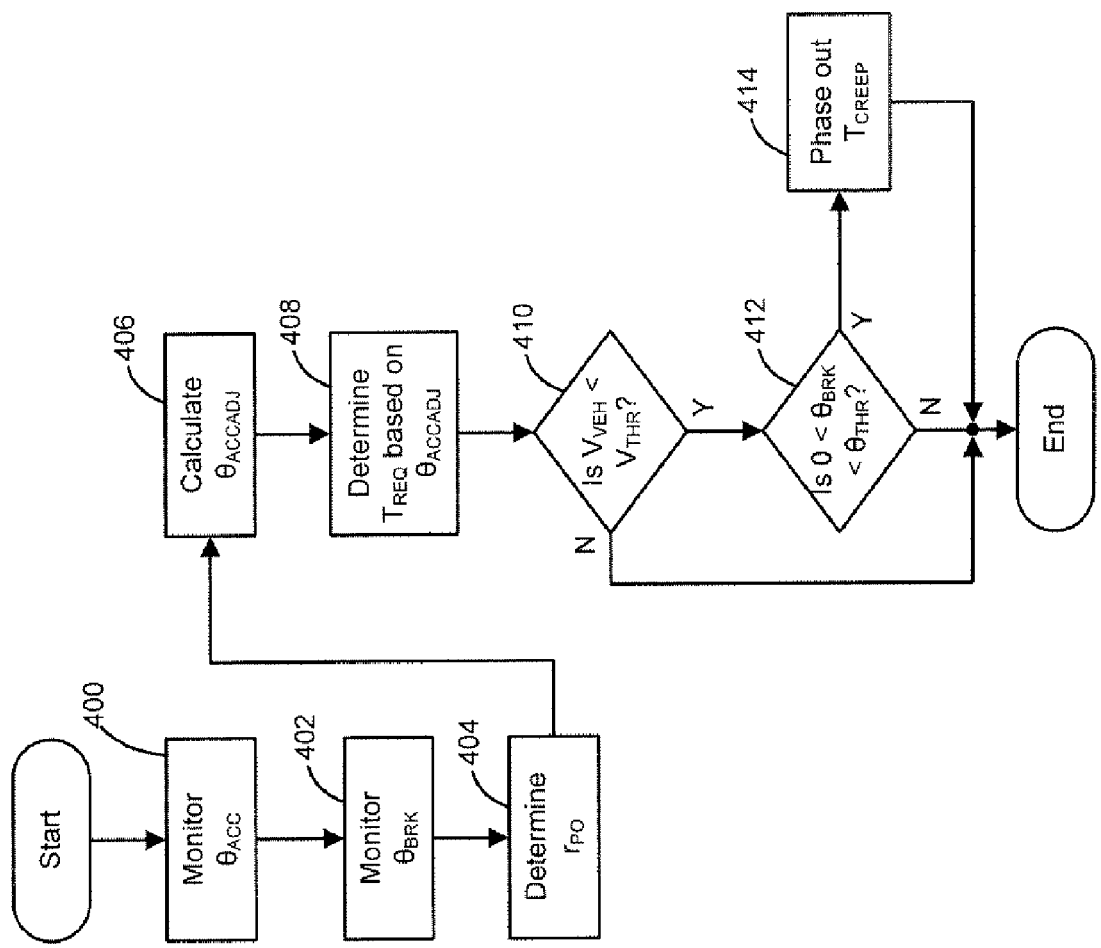
FIG. 4 is a flowchart illustrating exemplary steps executed by the drive torque control of the present invention.

Referring now to FIG. 4, exemplary steps executed by the drive torque control will be described in detail. In step 400 control monitors $\theta_{ACC}$. In step 402, control monitors $\theta_{BRK}$. Control determines $r_{PO}$ based on $\theta_{ACC}$ and $\theta_{BRK}$ in step 404. In step 406, control determines $\theta_{ACCADJ}$ based on $r_{PO}$ and $\theta_{BRK}$. Control determines $T_{REQ}$ based on $\theta_{ACCADJ}$ in step 408.

In step 410, control determines whether $V_{VEH}$ is less than $V_{THR}$. If $V_{VEH}$ is less than $V_{THR}$, control continues in step 412. If $V_{VEH}$ is not less than $V_{THR}$, control ends. In step 412, control determines whether $\theta_{BRK}$ is greater than 0 and less than $\theta_{THR}$. If $\theta_{BRK}$ is not greater than 0 and is less than $\theta_{THR}$, no adjustments are applied. If $\theta_{BRK}$ is greater than 0 and is less than $\theta_{THR}$, control phases out $T_{CREEP}$ in step 414.

Figure 5:
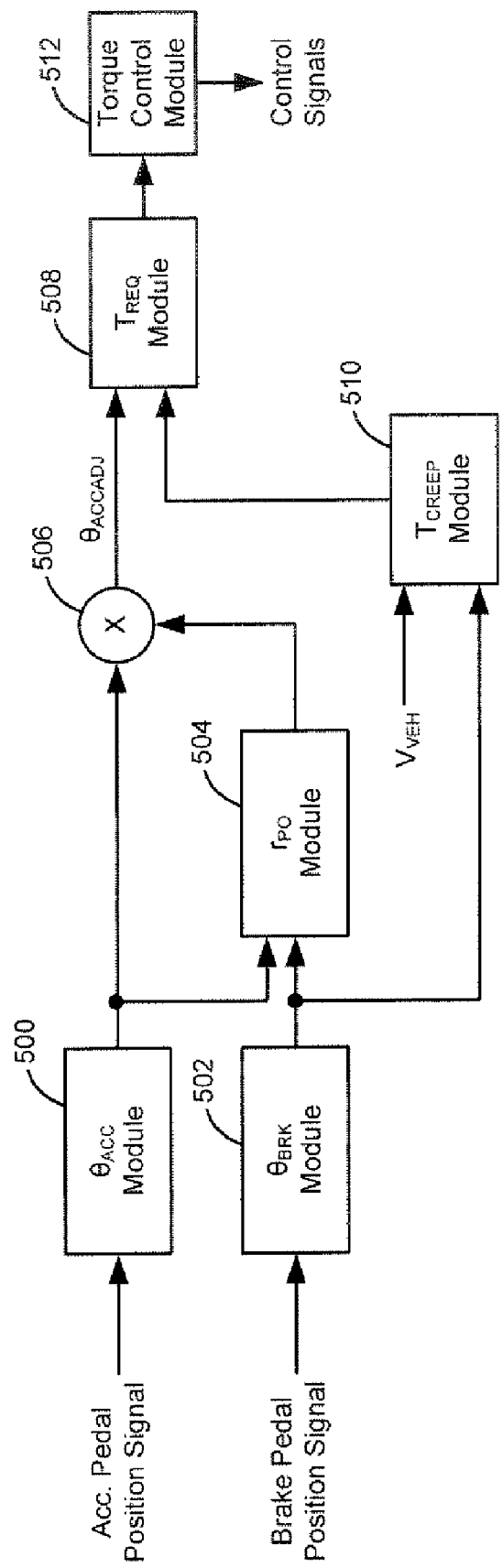
FIG. 5 is a functional block diagram of exemplary modules that execute the drive torque control of the present invention.

Referring now to FIG. 5, exemplary modules that execute the drive torque control will be described in detail. The exemplary modules include a $\theta_{ACC}$ module 500, a $\theta_{BRK}$ module 502, an $r_{PO}$ module 504, a multiplier 506, a $T_{REQ}$ module 508, a $T_{CREEP}$ module 510 and a torque control module 512. The $\theta_{ACC}$ module 500 determines $\theta_{ACC}$ based on the accelerator pedal position signal. The $\theta_{BRK}$ module 502 determines $\theta_{BRK}$ based on the brake pedal position signal. The $r_{PO}$ module 504 determines $r_{PO}$ based on $\theta_{ACC}$ and $\theta_{BRK}$. $\theta_{ACCADJ}$ is determined by the multiplier 506 as the product of $r_{PO}$ and $\theta_{ACC}$.

The $T_{REQ}$ module 508 determines $T_{REQ}$ based on $\theta_{ACCADJ}$ and $T_{CREEP}$. $T_{CREEP}$ is determined by the $T_{CREEP}$ module 510 based on $V_{VEH}$ and $\theta_{BRK}$. The torque control module 512 generates control signals based on $T_{REQ}$. More specifically, the torque control module 512 regulates operation of the engine 12 and/or the electric machine 14 to provide the requested drive torque.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A torque-based engine control system for regulating the drive torque provided to a driveline of a vehicle, comprising:
    a first module that monitors an accelerator pedal position;
    a second module that monitors a brake pedal position;
    a third module that determines an adjusted accelerator pedal position based on said accelerator pedal position and said brake pedal position;
    a fourth module that determines a drive torque request based on said adjusted accelerator pedal position; and
    a fifth module that regulates said drive torque based on said drive torque request.

2. The torque-based engine control system of claim 1 further comprising a sixth module that determines a phase-out ratio based on said brake pedal position and said accelerator pedal position.

3. The torque-based engine control system of claim 2 wherein said adjusted accelerator pedal position is determined as a product of said accelerator pedal position and said phase-out ratio.

4. The torque-based engine control system of claim 1 further comprising a sixth module that determines a creep torque based on a vehicle speed and said brake pedal position.

5. The torque-based engine control system of claim 4 wherein said creep torque decreases with increasing brake pedal position and increasing vehicle speed.

6. The torque-based engine control system of claim 4 wherein said drive torque is regulated based on said creep torque when said vehicle speed is below a threshold vehicle speed.

7. The torque-based engine control system of claim 4 wherein said creep torque is reduced when said brake pedal position is greater than zero and less than a threshold brake pedal position.

* * * * *